(12) United States Patent  
Hasegawa

(10) Patent No.: US 7,660,046 B2  
(45) Date of Patent: Feb. 9, 2010

(54) LENS BARREL AND IMAGE PICKUP DEVICE

(75) Inventor: Hiroshi Hasegawa, Tokyo (JP)

(73) Assignee: Konica Minolta Opto Inc., Tokyo (JP)

( * ) Notice: Subject to any disclaimer, the term of this patent is extended or adjusted under 35 U.S.C. 154(b) by 0 days.

(21) Appl. No.: 11/592,928

(22) Filed: Nov. 6, 2006

(65) Prior Publication Data

US 2007/0103798 A1    May 10, 2007

(30) Foreign Application Priority Data

Nov. 8, 2005    (JP)    ............................. 2005-323425

(51) Int. Cl.  
    *G02B 15/14*    (2006.01)
(52) U.S. Cl. ...................................... 359/696
(58) Field of Classification Search ................ 359/694, 359/641–651, 823, 696, 824  
See application file for complete search history.

(56) References Cited

U.S. PATENT DOCUMENTS

2005/0168834 A1* 8/2005 Matsumoto et al. ......... 359/694  
2005/0275315 A1* 12/2005 Manabe et al. .............. 310/328

* cited by examiner

*Primary Examiner*—Ricky L Mack  
*Assistant Examiner*—Vipin M Patel  
(74) *Attorney, Agent, or Firm*—Cohen Pontani Lieberman & Pavane LLP

(57) ABSTRACT

A lens barrel, includes: an image pickup optical system comprising a plurality of lens groups; a plurality of barrel members which house the image pickup optical system therein; and a drive source which moves at least two lens groups in the image pickup optical system in a direction of an optical axis, wherein the plurality of barrel members are split from each other into one on an object side with respect to the optical axis and one on an image surface side with respect to the optical axis, and the plurality of barrel members are fixed by a holding member of the drive source, the holding member being formed integrally with the drive source.

14 Claims, 5 Drawing Sheets

LENS BARREL AND IMAGE PICKUP DEVICE

BACKGROUND OF THE INVENTION

1. Field of the Invention

The present invention relates to a lens barrel which houses an image pickup optical system therein, and to an image pickup device which includes the lens barrel.

2. Description of the Related Art

Heretofore, a camera which mounts a zoom lens thereon has been commercially available. The zoom lens is constructed to perform a change of a focal length (zooming) in such a manner that a plurality of lens groups constructing the optical system are moved to desired positions along an optical axis thereof, and to change intervals therebetween.

Meanwhile, a camera which includes a so-called bending optical system in which the optical axis is bent by disposing a reflecting surface, has been known. The camera which includes the bending optical system has an advantage that a lens barrel does not protrude from a front surface of the camera at a time of shooting an image and that a form of the camera is not changed even if performing the zooming.

In order to move such a lens group in the bending optical system, the technique in which a shaft is disposed substantially parallel to the optical axis to use the shaft as a guide shaft for guiding straight the lens group, and a lens frame is directly slid by a motor and a lead screw along the guide shaft to move straight the lens group, is frequently used.

As a lens barrel which houses the bending optical system as described above therein, there is one having a structure in which there is used such a lens barrel split into halves as a barrel member on an object side with respect to an optical axis having been bent by the reflecting surface and as a barrel member on an image surface side with respect thereto, a unit composed of a motor, a lead screw and a holding member thereof for moving one of lens groups is attached onto one of the barrel members, and a unit composed of a motor, a lead screw and a holding member thereof for moving the other lens group is attached onto the other barrel member (for example, refer to FIG. 8 and FIG. 9 in JP-Tokukai-2005-121882A).

Even in the camera including the above-described bending optical system, a request for downsizing and thinning of an outer shape thereof is large. Following this fact, an image pickup optical system built in the camera is required to be further downsized.

The lens barrel described in the foregoing JP-Tokukai-2005-121882A requires spaces necessary for screw holes for attaching, onto the two barrel members, the units each of which is composed of the motor, the lead screw, and the holding member thereof, and further requires spaces necessary for positioning the two barrel members and for screw holes for the purpose of coupling the two barrel members to each other. Since the lens barrel must ensure these spaces, the lens barrel has a drawback that the entirety thereof is upsized undesirably.

Moreover, when the image pickup optical system is shortened, sensitivity thereof to an error of an axial deviation of each lens group is increased. Hence, when each lens group in the lens barrel causes a minute axial deviation in a direction perpendicular to the optical axis, there occurs a problem that image forming performance is decreased.

SUMMARY OF THE INVENTION

In consideration for the above-described problem, it is an object of the present invention to obtain a lens barrel which is further downsized and is capable of maintaining good image forming performance, and it is another object of the present invention to obtain a compact image pickup device including the above lens barrel.

In order to achieve the foregoing objects, according to a first aspect of the present invention, a lens barrel, comprises: an image pickup optical system comprising a plurality of lens groups; a plurality of barrel members which house the image pickup optical system therein; and a drive source which moves at least two lens groups in the image pickup optical system in a direction of an optical axis, wherein the plurality of barrel members are split from each other into one on an object side with respect to the optical axis and one on an image surface side with respect to the optical axis, and the plurality of barrel members are fixed by a holding member of the drive source, the holding member being formed integrally with the drive source.

Moreover, preferably, the plurality of barrel members are positioned by the holding member.

Furthermore, preferably, the image pickup optical system is a bending optical system in which a reflecting surface is disposed.

Furthermore, preferably, the holding member sandwiches a plane including a first optical axis which is not bent by the reflecting surface and a second optical axis which is bent by the reflecting surface, and the holding member is arranged along the second optical axis.

Moreover, according to a second aspect of the present invention, a lens barrel, comprises: an image pickup optical system comprising a plurality of lens groups; and a barrel member which houses the image pickup optical system therein, wherein an opening portion is formed in the barrel member, and a lens fixed integrally with a unit including at least one of an aperture and a shutter is movable in a direction perpendicular to an optical axis by using the opening portion.

Moreover, preferably, the barrel member is split into one on an object side with respect to the optical axis and one on an image surface side with respect the optical axis.

Furthermore, preferably, the image pickup optical system is a bending optical system in which a reflecting surface is disposed.

Moreover, according to a third aspect of the present invention, an image pickup device comprises, one of the lens barrels described above.

PREFERRED EMBODIMENTS OF THE PRESENT INVENTION

A description will be made below in detail of the present invention by an embodiment. However, the present invention is not limited to this.

Figure 1:
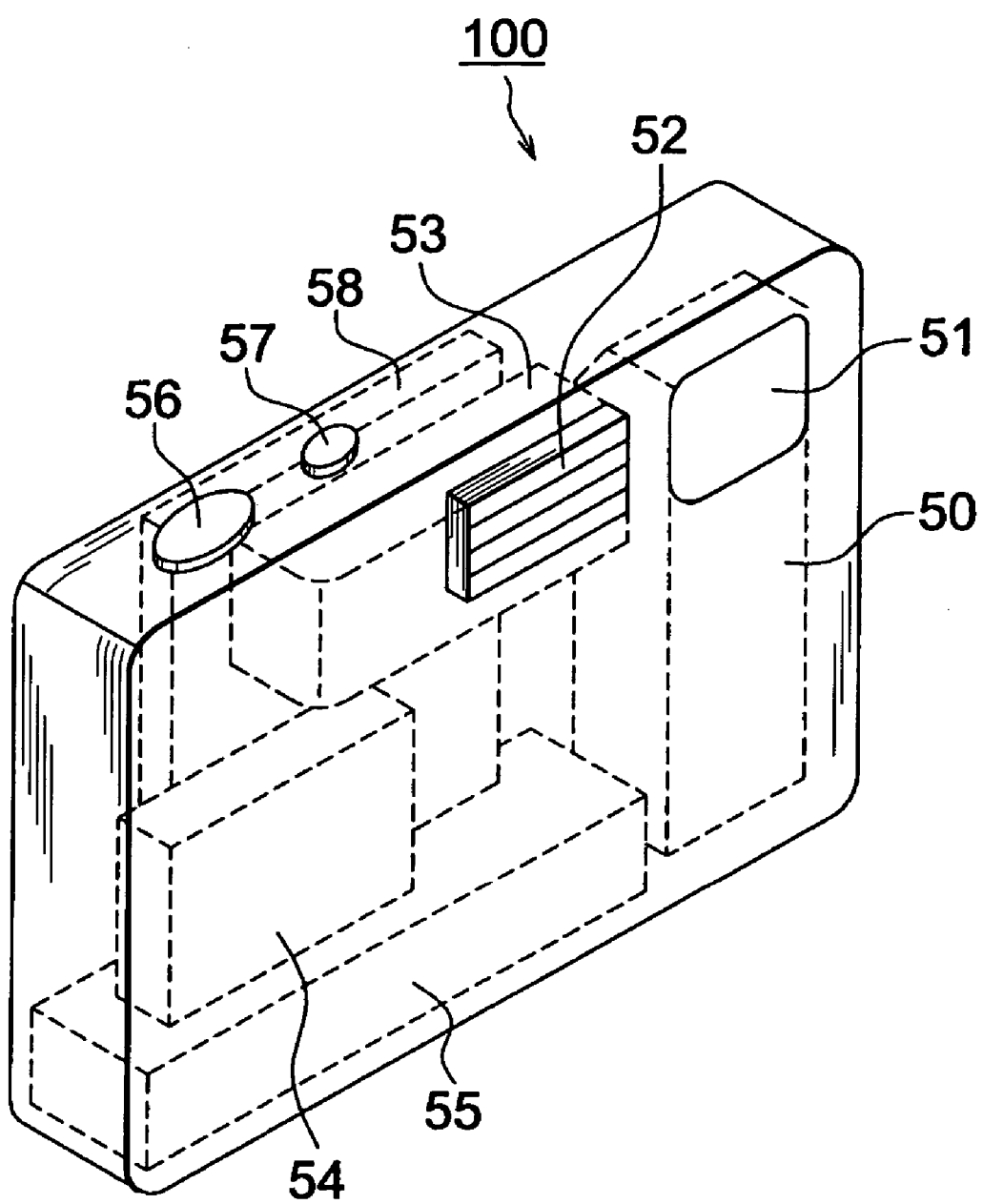
FIG. 1 is a view showing an example where main constituent units of a camera as an example of an image pickup device including a lens barrel according to an embodiment of the present invention are arranged in the camera.

FIG. 1 is a view showing an example where main constituent units of a camera 100 as an example of an image pickup device including a lens barrel according to this embodiment are arranged in the camera 100. FIG. 1 is a perspective view of the camera 100 viewed from a subject side.

As shown in FIG. 1, in the camera 100, a lens barrel 50 according to the present invention, which includes a bending image pickup optical system capable of scaling, is disposed longitudinally on a right side of the camera 100 as shown, and an opening portion 51 is disposed so as to capture a luminous flux of the subject. On the opening portion 51, there is provided a lens barrier (not shown) which sets an opening state of exposing the opening portion 51 and a closing state of covering the opening portion 51.

Reference numeral 52 denotes a flash light emitting window. Reference numeral 53 denotes a flash unit which is disposed behind the flash light emitting window and comprises a reflector and a xenon tube, and in addition, a main capacitor, a circuit board, and the like. Reference numeral 54 denotes a card-type memory for recording images. Reference numeral 55 denotes a battery which supplies power to the respective units of this camera. The image recording memory 54 and the battery 55 are made detachable from a lid portion (not shown) of the camera 100.

On an upper surface of this camera, a release button 56 is disposed. By one-step pressing of the release button 56, a shooting standby operation of the camera, that is, a focusing operation and a photometric operation are performed. By two-step pressing of the release button 56, a shooting/exposing operation is performed. Reference numeral 57 denotes a main switch which is a switch for switching the camera between an operation state and a non-operation state. When the camera is switched to the operation state by the main switch 57, the lens barrier (not shown) is switched to the opening state, and the respective units start operations thereof. Meanwhile, when the camera is switched to the non-operation state by the main switch 57, the lens barrier (not shown) is switched to the closing state, and the respective units finish the operations thereof.

On a back surface of this camera, there is disposed an image display unit 58 which comprises an LCD, an organic EL, or the like and displays an image, and character information and the like. Moreover, on the back surface, there are arranged operating members such as a zoom button which zooms up and down, a replay button which replays shot images, a menu button which displays various menus on the image display unit 58, and a selection button which selects a desired function from the displayed menus, although the members are not shown.

Moreover, between these main constituent units, a circuit board which interconnects the respective units and has various electronic parts mounted thereon is disposed, although the circuit board is not shown. The circuit board is constructed to drive and control the respective main constituent units. The camera comprises an external input/output terminal, a strap attachment portion, a tripod base, and the like, although they are not shown similarly.

Figure 2:
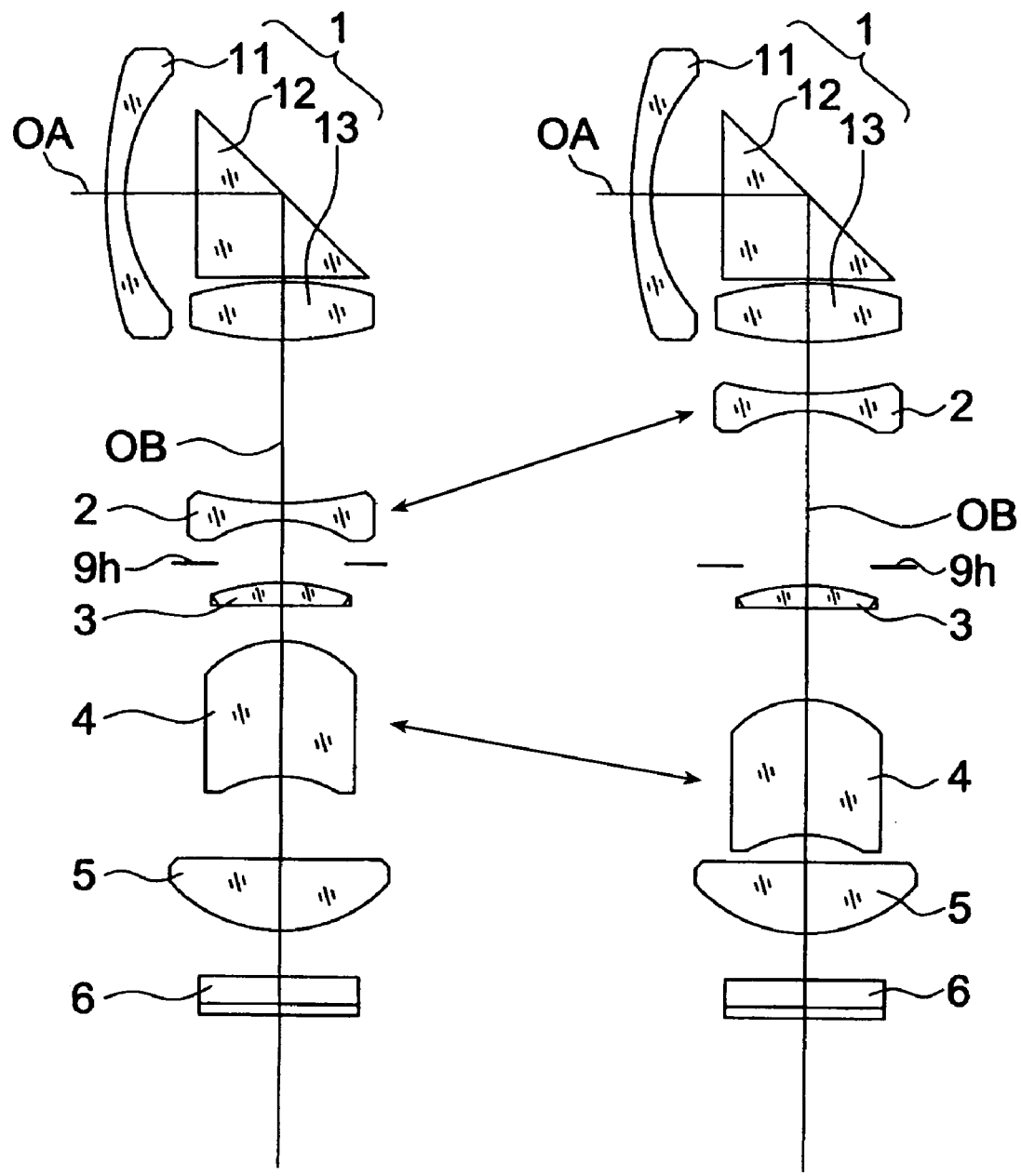
FIGS. 2A and 2B are views showing an image pickup optical system housed in the lens barrel according to this embodiment.

FIGS. 2A and 2B are views showing the image pickup optical system housed in the lens barrel 50 according to this embodiment. FIG. 2A shows positions of the respective lens groups in a wide state, and FIG. 2B shows positions of the respective lens groups in a telescope state.

In FIGS. 2A and 2B, reference numeral 1 denotes a first lens group. The first lens group 1 comprises: a lens 11 disposed toward the subject when an optical axis thereof is set as OA; a prism 12 as a reflecting member which bends the optical axis OA in a substantially perpendicular direction; and a lens 13 disposed when an optical axis thereof is set as an optical axis OB which is bent by the prism 12. This first lens group 1 is a lens group which does not move and is fixed.

Reference numeral 2 denotes a second lens group. The second lens group is a lens group which moves together with a lens frame (not shown) in a direction of the optical axis OB as shown at a time of scaling (hereinafter, also referred to as zooming).

Reference numeral 3 denotes a third lens group, which is incorporated in a shutter unit (not shown). This third lens group 3 is a lens group which does not move in the direction of the optical axis OB. Moreover, a portion 9h in front of the third lens group 3 is an operating surface of a shutter. Note that, in this example, the portion 9h is defined as the operating surface of the shutter in the shutter unit; however, at least one of an aperture and the shutter may be disposed.

Reference numeral 4 denotes a fourth lens group. The fourth lens group is a lens group which moves together with the lens frame (not shown) in the direction of the optical axis OB as shown at the time of scaling and at a time of adjusting a focal point (hereinafter, also referred to as focusing).

Reference numeral 5 denotes a fifth lens group. This fifth lens group is a lens group which does not move in the direction of the optical axis OB and which is fixed.

Reference numeral 6 denotes an image pickup element. For the image pickup element, an image sensor of a charge coupled device (CCD) type, an image sensor of a complementary metal-oxide semiconductor (CMOS) type, or the like is used.

Note that, in front of the image pickup element 6, an infrared cut filter is disposed, and according to needs, an optical low-pass filter is disposed as appropriate.

Figure 3:
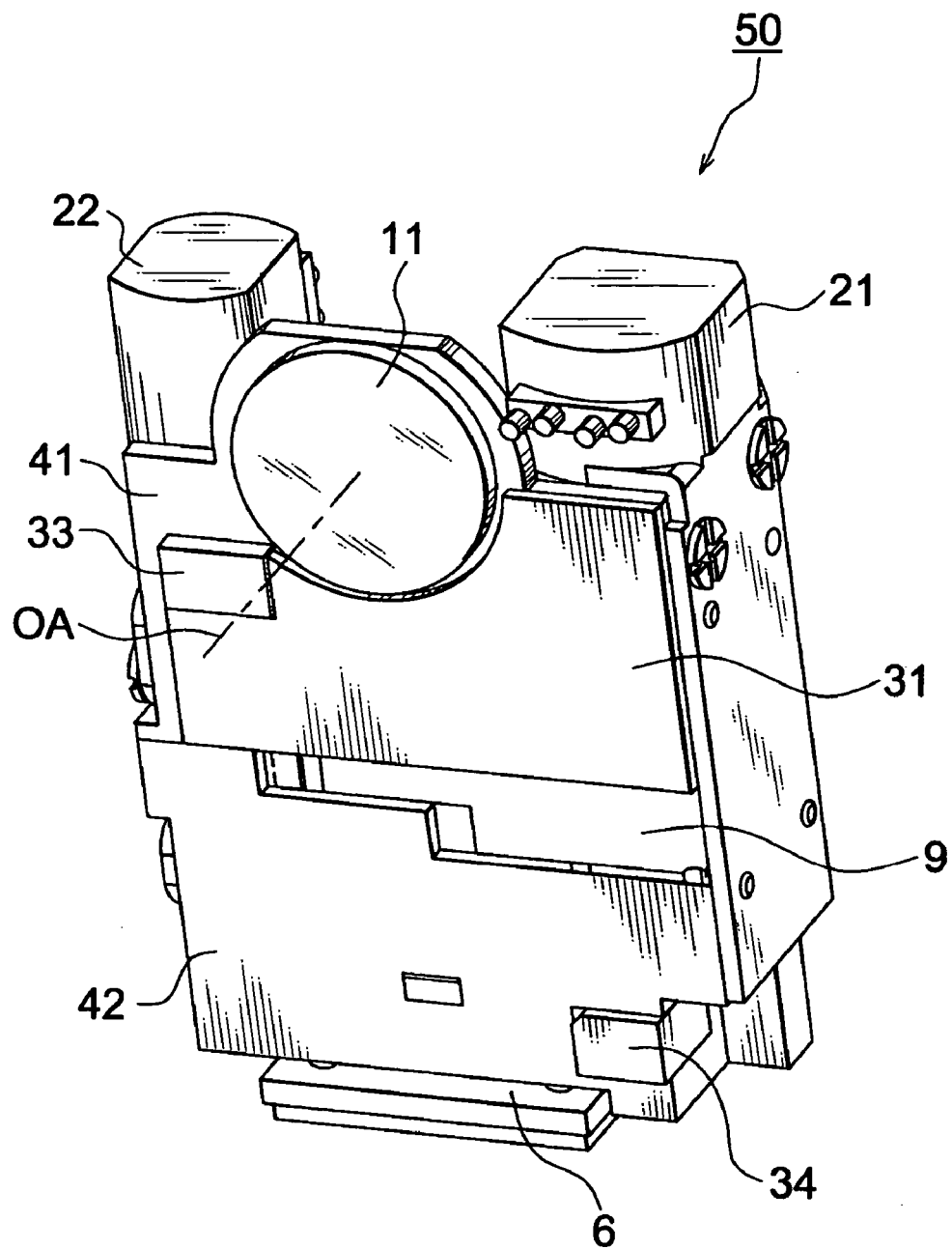
FIG. 3 is a schematic perspective view showing a state where the lens barrel according to this embodiment is assembled as a unit.

FIG. 3 is a schematic perspective view where the lens barrel 50 according to this embodiment is assembled as a unit.

As shown in FIG. 3, the lens barrel 50 is split into two barrel members which are a barrel 41 on an object side with respect to the optical axis and a barrel 42 on an image surface side with respect thereto. Between the barrel 41 on the object side and the barrel 42 on the image surface side, the shutter unit 9 is disposed.

In the barrel 41 on the object side, the first lens group and the second lens group, which are shown in FIGS. 2A and 2B, are housed.

The barrel 42 on the image surface side includes the shutter unit 9 to which the third lens group is integrally fixed. Moreover, the barrel 42 houses the fourth lens group and the fifth lens group therein, and has the image pickup element 6 assembled thereto (refer to FIGS. 2A and 2B).

As shown in FIG. 3, a first motor 21 which moves the second lens group and a second motor 22 which moves the fourth lens group 4 are arranged on both sides of the first lens 11 and of the prism disposed behind the first lens 11.

Reference numeral 33 denotes a photo interrupter which detects a reference position of the second lens group, and reference numeral 34 denotes a photo interrupter which detects a reference position of the fourth lens group.

The first motor 21, the second motor 22, the photo interrupters 33 and 34, and the image pickup element 6, which are described above, are connected to a flexible printed board (not shown), are connected to other circuits in the camera, and are constructed to be individually driven and controlled.

A description will be made below of assembly of the lens barrel 50 according to this embodiment and a structure thereof.

Figure 4:
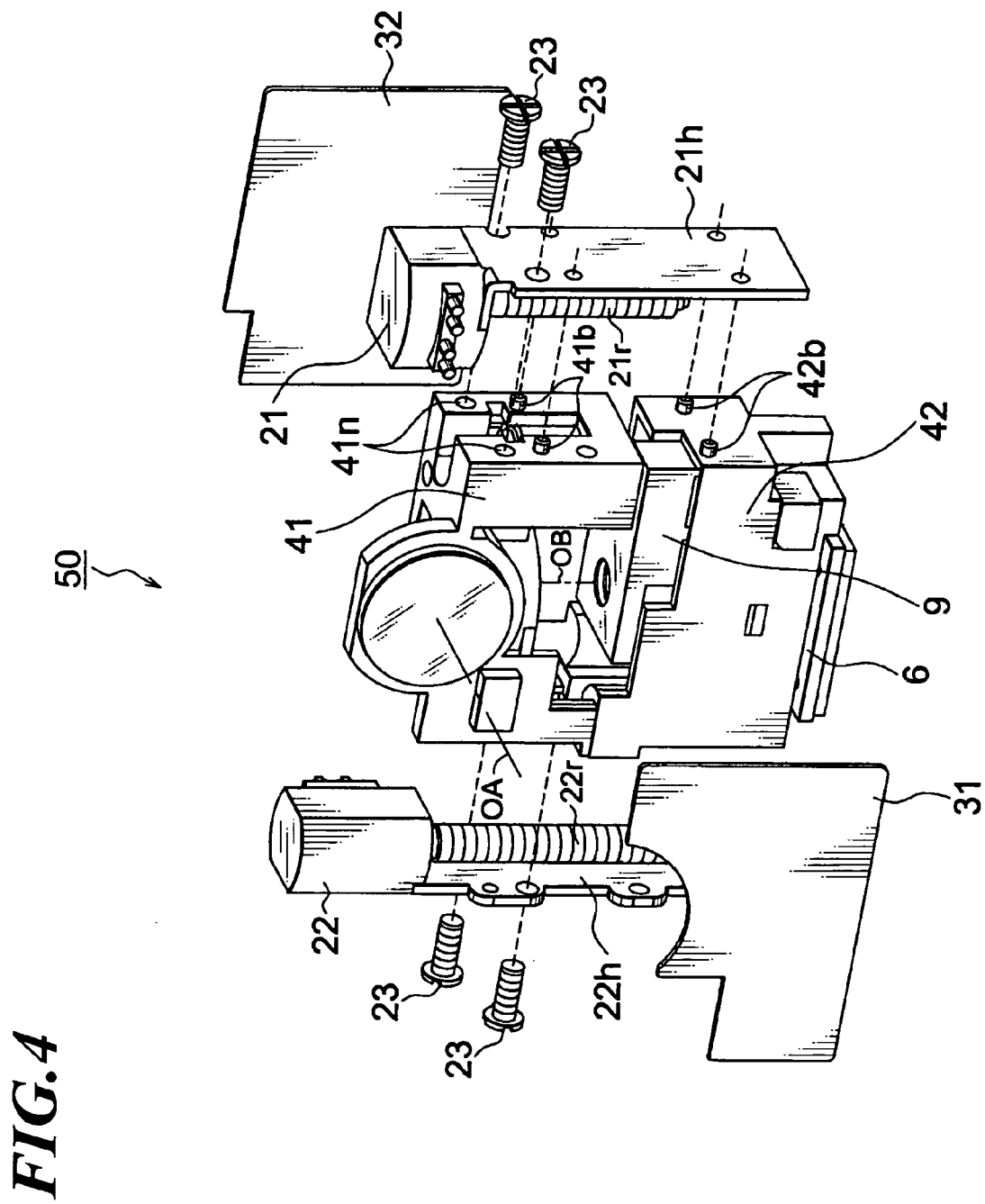
FIG. 4 is an exploded perspective view of the lens barrel according to this embodiment.

FIG. 4 is an exploded perspective view of the lens barrel 50 according to this embodiment. In the drawing to be explained below, the same reference numerals will be assigned to the same functional members for the purpose of avoiding duplication of the description.

As shown in FIG. 4, the lens barrel 50 is split into the barrel 41 on the object side and the barrel 42 on the image surface side in the direction of the optical axis OB. In the barrel 41, the first lens group and the second lens group are housed. In the barrel 42, the shutter unit 9 into the inside of which the third lens group is assembled, the fourth lens group, and the fifth lens group, are housed. Moreover, the image pickup element 6 is assembled to the barrel 42.

On a side surface of the barrel 41 on the object side, screw holes 41n and bosses 41b are individually formed. Note that, also on a side surface of the barrel 41 on the second motor 22 side, which is on a back surface side in FIG. 4, screw holes and bosses are formed in a similar way.

On a side surface of the barrel 42 on the image surface side, bosses 42b are formed. In a similar way, also on a side surface of the barrel 42 on the second motor 22 side,. which is on a back surface side in FIG. 4, bosses are formed.

On a drive shaft of the first motor 21, a lead screw 21r is formed. Moreover, on the first motor 21, a holding member 21h for holding the first motor 21 is provided. In a similar way, on a drive shaft of the second motor 22, a lead screw 22r is formed. Moreover, on the second motor 22, a holding member 22h for holding the second motor 22 is provided.

In the holding member 21h for holding the first motor 21, holes and U-shaped notches are formed at positions corresponding to the screw holes 41n and the bosses 41b. In a similar way, also in the holding member 22h for holding the second motor 22, holes and U-shaped notches are formed at positions corresponding to the screw holes and the bosses.

With such a construction as described above, the holding member 21h for holding the first motor 21 is incorporated into the barrels 41 and 42 from the side thereof so that the hole portions formed therein can be engaged with the bosses 41b of the barrel 41 and the bosses 42b of the barrel 42. Subsequently, the holding member 21h is fixed to the barrels 41 and 42 by screws 23. In a similar way, also on the other surfaces of the barrels 41 and 42, the holding member 22h for holding the second motor 22 is incorporated into the barrels 41 and 42 from the side thereof so that the hole portions formed therein can be engaged with the bosses formed in the barrels 41 and 42. Subsequently, the holding member 22h is fixed to the barrels 41 and 42 by screws 23. Specifically, the holding members 21h and 22h are arranged at positions so as to sandwich the optical axis OB which is bent and go along with the optical axis OB.

In such a way, the image pickup optical systems which have been partitioned in the direction of the optical axis come to continue with each other, thereby establishing the arrangement shown in FIGS. 2A and 2B.

Moreover, although it is not shown, it becomes possible for the lead screw 21r to be screwed with a part of the lens frame which holds the second lens group and to move the second lens group, and it becomes possible for the lead screw 22r to be screwed with a part of the lens frame which holds the fourth lens group and to move the fourth lens group.

As described above, the two barrel members split from each other in the direction of the optical axis can be fixed by the holding members 21h and 22h formed integrally with the first motor 21 and the second motor 22, respectively. It is unnecessary to particularly ensure the spaces necessary for positioning the two barrel members and for the screw holes for the purpose of attaching the units each of which comprises the motor, the lead screw, and the holding member thereof; and the similar spaces necessary for positioning the two barrel members and for the screw holes for the purpose of coupling the two barrel members to each other and the spaces can be shared. Accordingly, it becomes possible to obtain a lens barrel and an image pickup device, which are further downsized.

Moreover, the two holding members 21h and 22h are arranged on both sides so as to sandwich a plane including the optical axis OA which is not bent and the optical axis OB which is bent and go along with the optical axis OB which is bent, thus making it possible to form the lens barrel so that a thickness thereof in the direction of the optical axis OA can be thin.

Note that the description has been made of an example where, in the lens barrel 50 of FIG. 4, the barrel 41 and the barrel 42 are positioned and fixed by the holding members 21h and 22h; however, a construction may be adopted, in which the barrel 41 and the barrel 42 are positioned with respect to each other and are fixed by the holding members 21h and 22h.

Figure 5:
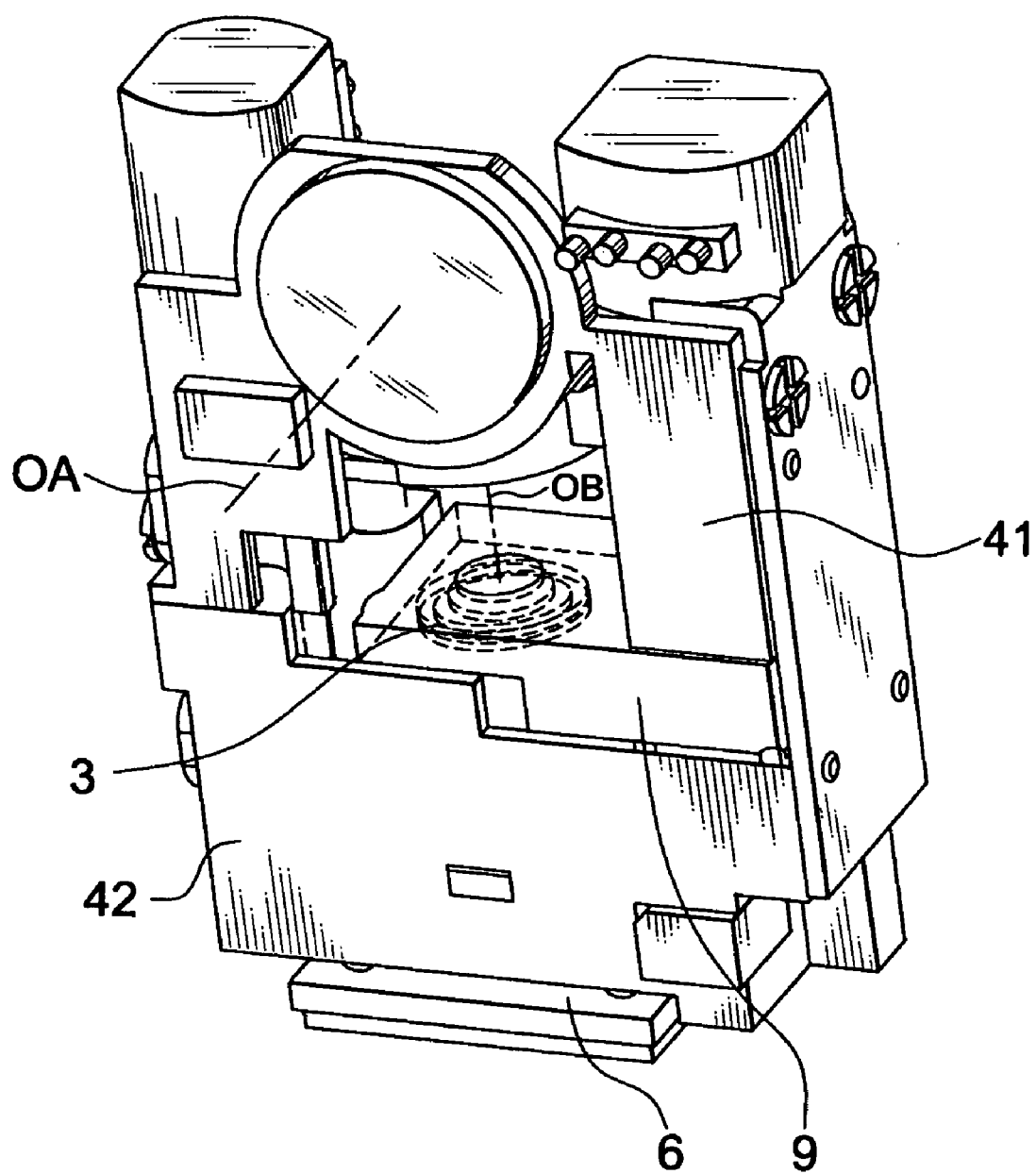
FIG. 5 is a perspective view showing a state where barrel members are fixed by holding members.

FIG. 5 is a perspective view showing a state where the barrel members are fixed by the holding members 21h and 22h.

As shown in FIG. 5, an opening portion is formed on the barrel 41, and the shutter unit 9 which holds the third lens group in the inside thereof is exposed from the opening portion to the outside. In this state, the shutter unit 9 is made movable in a direction perpendicular to the optical axis OB.

The image pickup element 6 is driven in this state, and is made to pick up a predetermined chart and display the chart on a monitor. Subsequently, a jig is inserted into the opening portion, thereby moving the shutter unit 9 in the direction perpendicular to the optical axis OB. Specifically, the third lens group 3 is moved in the direction perpendicular to the optical axis OB, and the shutter unit 9 is fixed at a position where quality of a chart image reaches a desired state while observing the chart image. It is preferable that such fixing be performed by adhesion.

In such a way, even if a minute axial deviation occurs between the first and second lens groups housed in the barrel 41 and the fourth and fifth lens groups housed in the barrel 42, optical performance of the lens barrel can be prevented from being deteriorated by adjusting the third lens group 3 in the direction perpendicular to the optical axis. Note that such adjustment may be axis adjustment for a specific lens group or may be adjustment of an image forming balance of peripheral portions.

Specifically, even if the micro deviation occurs between the optical axes of the lens groups in the barrel members after all the lens groups are assembled, it becomes possible to obtain an image derived from good image forming performance by adopting a construction in which the lens disposed in the inside of the barrel members and fixed integrally with the aperture and the shutter unit can be moved in the direction perpendicular to the optical axis and can be adjusted. Moreover, even in a case of a construction where the lens is not exposed, for example, where the lens is disposed on the image pickup element side in the inside of the aperture and the shutter unit, the above-described adjustment can be performed by moving the lens together with the aperture and the shutter unit.

After the above-described adjustment is finished, lid members 31 and 32 shown in FIG. 4 and formed of a sheet material or a plate material are assembled so as to cover the opening portion of the barrel 41, thereby forming the lens barrel 50 in a unit state shown in FIG. 3.

As described above, in accordance with the lens barrel according to this embodiment, it becomes possible to further downsize the barrel members, and it becomes possible to obtain a lens barrel which is capable of obtaining a good image of the subject, and further, it becomes possible to obtain a more compact image pickup device.

Note that the description has been made of the above-described embodiment by taking the camera as an example of the image pickup device. However, the present invention is not limited to this. It is a matter of course that the image pickup device also includes a camera module mounted in a cellular phone, a personal digital assistant (PDA), or the like.

The entire disclosure of Japanese Patent Application No. Tokugan 2005-323425 filed on Nov. 8, 2005 including specification, claims, drawings and summary are incorporated herein by reference in its entirety.

What is claimed is:

1. A lens barrel, comprising:
a first barrel member housing a first lens;
a second barrel member housing a second lens; and
a driving source comprising:
an electromechanical converting section to convert an electric signal to a mechanical movement; and
a holding member holding the electromechanical converting section,
wherein the first and second barrel members are split from each other, at an aperture or a shutter, into one on an object side and one on an image surface side with respect to an optical axis, and
wherein the first barrel member and the second barrel member are fixed to the holding member from a direction perpendicular to an optical axis direction of the second lens, and
wherein the driving source drives the second lens in its optical axis direction.

2. The lens barrel of claim 1, further comprising an image pickup optical system, wherein the image pickup optical system is a bending optical system in which a reflecting surface is disposed.

3. The lens barrel of claim 2, wherein the holding member sandwiches a plane including a first optical axis which is to be bent by the reflecting surface and a second optical axis which is bent by the reflecting surface, and the holding member is arranged along the second optical axis.

4. The lens barrel of claim 1, wherein the electromechanical converting section is a motor.

5. The lens barrel of claim 1, wherein the holding member comprises a screw member to convert a revolving movement generated by the electromechanical converting section to a translatory movement.

6. The lens barrel of claim 1, wherein the first barrel member and the second barrel member are fixed with respect to each other by the holding member and the driving source drives the second lens relative to the first and second barrel members.

7. The lens barrel of claim 1, wherein the first barrel member and the second barrel member are fixed to the holding member by a screw.

8. A lens barrel, comprising:
a first barrel member housing a first lens;
a second barrel member housing a second lens with an optical axis direction;
a driving source comprising an electromechanical converting section to convert an electric signal to a mechanical movement, the driving source driving the second lens in its optical axis direction; and
a holding member holding the electromechanical converting section and fixing the first and second barrel members in the optical axis direction of the second lens;
wherein the first and second barrel members are split from each other, at an aperture or a shutter, into one on an object side and one on an image surface side with respect to an optical axis.

9. The lens barrel of claim 8, further comprising an image pickup optical system, wherein the image pickup optical system is a bending optical system in which a reflecting surface is disposed.

10. The lens barrel of claim 9, wherein the holding member sandwiches a plane including a first optical axis which is to be bent by the reflecting surface and a second optical axis which is bent by the reflecting surface, and the holding member is arranged along the second optical axis.

11. The lens barrel of claim 8, wherein the electromechanical converting section is a motor.

12. The lens barrel of claim 8, wherein the holding member comprises a screw member to convert a revolving movement generated by the electromechanical converting section to a translatory movement.

13. The lens barrel of claim 8, wherein the first barrel member and the second barrel member are fixed with respect to each other by the holding member and the driving source drives the second lens relative to the first and second barrel members.

14. The lens barrel of claim 8, wherein the first barrel member and the second barrel member are fixed to the holding member by a screw.

* * * * *